United States Patent
Knopsnyder et al.

(10) Patent No.: US 10,658,127 B2
(45) Date of Patent: May 19, 2020

(54) NONAQUEOUS ELECTROLYTE FOR AN ULTRACAPACITOR

(71) Applicant: AVX Corporation, Fountain Inn, SC (US)

(72) Inventors: Jonathan Robert Knopsnyder, Fountain Inn, SC (US); Bharat Rawal, Surfside Beach, SC (US)

(73) Assignee: AVX Corporation, Fountain Inn, SC (US)

( * ) Notice: Subject to any disclaimer, the term of this patent is extended or adjusted under 35 U.S.C. 154(b) by 0 days.

(21) Appl. No.: 15/598,833

(22) Filed: May 18, 2017

(65) Prior Publication Data

US 2017/0338059 A1    Nov. 23, 2017

Related U.S. Application Data

(60) Provisional application No. 62/339,153, filed on May 20, 2016.

(51) Int. Cl.
*H01G 11/38*   (2013.01)
*H01G 11/60*   (2013.01)
(Continued)

(52) U.S. Cl.
CPC ............ *H01G 11/38* (2013.01); *H01G 11/18* (2013.01); *H01G 11/24* (2013.01); *H01G 11/60* (2013.01);
(Continued)

(58) Field of Classification Search
CPC ........ H01G 11/60; H01G 11/18; H01G 11/82; H01G 11/68; H01G 11/32; H01G 9/0003; H01G 9/08
See application file for complete search history.

(56) References Cited

U.S. PATENT DOCUMENTS

| 4,327,400 A | 4/1982 | Muranaka et al. |
| 4,542,444 A | 9/1985 | Boland |

(Continued)

FOREIGN PATENT DOCUMENTS

| CN | 101774567 A | 7/2010 |
| CN | 101844765 B | 1/2012 |

(Continued)

OTHER PUBLICATIONS

Product Information on TIMREX® Graphite and ENASCO™ Carbon Black from TIMCAL Ltd., 2004, 24 pages.

(Continued)

*Primary Examiner* — David M Sinclair
(74) *Attorney, Agent, or Firm* — Dority & Manning, P.A.

(57) ABSTRACT

An ultracapacitor that contains a first electrode, second electrode, separator, nonaqueous electrolyte, and housing is provided. The first electrode comprises a first current collector electrically coupled to a first carbonaceous coating and the second electrode comprises a second current collector electrically coupled to a second carbonaceous coating. The nonaqueous electrolyte is in ionic contact with the first electrode and the second electrode, wherein the nonaqueous electrolyte contains an ionic liquid that is dissolved in a nonaqueous solvent at a concentration of about 1.0 mole per liter or more. The nonaqueous solvent has a boiling temperature of about 150° C. or more.

23 Claims, 4 Drawing Sheets

(51) Int. Cl.
*H01G 11/82* (2013.01)
*H01G 11/62* (2013.01)
*H01G 11/28* (2013.01)
*H01G 11/24* (2013.01)
*H01G 11/18* (2013.01)
*H01G 11/68* (2013.01)
*H01G 11/52* (2013.01)

(52) U.S. Cl.
CPC ............ *H01G 11/62* (2013.01); *H01G 11/68* (2013.01); *H01G 11/82* (2013.01); *H01G 11/28* (2013.01); *H01G 11/52* (2013.01); *Y02E 60/13* (2013.01)

(56) References Cited

U.S. PATENT DOCUMENTS

| | | |
|---|---|---|
| 4,737,889 A | 4/1988 | Nishino et al. |
| 5,064,805 A | 11/1991 | Otowa |
| 5,079,674 A | 1/1992 | Malaspina |
| 5,150,283 A | 9/1992 | Yoshida et al. |
| 5,532,083 A | 7/1996 | McCullough |
| 5,603,867 A | 2/1997 | Ohsaki et al. |
| 5,621,607 A | 4/1997 | Farahmandi et al. |
| 5,777,428 A | 7/1998 | Farahmandi et al. |
| 5,862,035 A | 1/1999 | Farahmandi et al. |
| 5,876,787 A | 3/1999 | Avarbz et al. |
| 5,907,472 A | 5/1999 | Farahmandi et al. |
| 5,965,054 A | 10/1999 | McEwen et al. |
| 5,969,936 A | 10/1999 | Kawasato et al. |
| 5,972,537 A | 10/1999 | Mao et al. |
| 5,989,464 A | 11/1999 | Saito et al. |
| 6,019,803 A | 2/2000 | Oskam et al. |
| 6,031,712 A | 2/2000 | Kurihara et al. |
| 6,059,847 A | 5/2000 | Farahmandi et al. |
| 6,064,562 A | 5/2000 | Harada et al. |
| 6,072,692 A | 6/2000 | Hiratsuka et al. |
| 6,072,693 A | 6/2000 | Tsushima et al. |
| 6,094,788 A | 8/2000 | Farahmandi et al. |
| 6,110,335 A | 8/2000 | Avarbz et al. |
| 6,191,935 B1 | 2/2001 | Okamura et al. |
| 6,195,251 B1 | 2/2001 | Suhara et al. |
| 6,198,620 B1 | 3/2001 | Wei et al. |
| 6,198,621 B1 | 3/2001 | Saito et al. |
| 6,201,685 B1 | 3/2001 | Jerabek et al. |
| 6,233,135 B1 | 5/2001 | Farahmandi et al. |
| 6,264,707 B1 | 7/2001 | Ishikawa et al. |
| 6,288,888 B1 | 9/2001 | Sakata et al. |
| 6,291,069 B1 | 9/2001 | Noguchi et al. |
| 6,304,426 B1 | 10/2001 | Wei et al. |
| 6,320,740 B1 | 11/2001 | Saito et al. |
| 6,327,136 B1 | 12/2001 | Meguro et al. |
| 6,352,565 B2 | 3/2002 | Suhara et al. |
| 6,356,432 B1 | 3/2002 | Danel et al. |
| 6,379,402 B1 | 4/2002 | Suhara et al. |
| 6,414,837 B1 | 7/2002 | Sato et al. |
| 6,447,555 B1 | 9/2002 | Okamura et al. |
| 6,451,073 B1 | 9/2002 | Farahmandi et al. |
| 6,459,564 B1 | 10/2002 | Watanable et al. |
| 6,487,066 B1 | 11/2002 | Niiori et al. |
| 6,493,210 B2 | 12/2002 | Nonaka et al. |
| 6,507,480 B2 | 1/2003 | Nomoto et al. |
| 6,525,923 B2 | 2/2003 | Ishikawa et al. |
| 6,535,373 B1 | 3/2003 | Smith et al. |
| 6,558,437 B2 | 5/2003 | Wei et al. |
| 6,565,701 B1 | 5/2003 | Jerabek et al. |
| 6,585,152 B2 | 7/2003 | Farahmandi et al. |
| 6,602,742 B2 | 8/2003 | Maletin et al. |
| 6,627,252 B1 | 9/2003 | Nanjundiah et al. |
| 6,631,072 B1 | 10/2003 | Paul et al. |
| 6,631,074 B2 | 10/2003 | Bendale et al. |
| 6,638,385 B2 | 10/2003 | Ishikawa et al. |
| 6,643,119 B2 | 11/2003 | Nanjundiah et al. |
| 6,697,249 B2 | 2/2004 | Maletin et al. |
| 6,710,999 B2 | 3/2004 | Kawasato et al. |
| 6,721,168 B2 | 4/2004 | Takeuchi et al. |
| 6,728,096 B1 | 4/2004 | Smith et al. |
| 6,768,631 B2 | 7/2004 | Uehara et al. |
| 6,800,222 B1 | 10/2004 | Noguchi et al. |
| 6,804,108 B2 | 10/2004 | Nanjundiah et al. |
| 6,808,845 B1 | 10/2004 | Nonaka et al. |
| 6,813,139 B2 | 11/2004 | Bendale et al. |
| 6,830,594 B2 | 12/2004 | Shinozaki et al. |
| 6,831,826 B2 | 12/2004 | Iwaida et al. |
| 6,842,328 B2 | 1/2005 | Schott et al. |
| 6,842,330 B2 | 1/2005 | Farahmandi et al. |
| 6,847,517 B2 | 1/2005 | Iwaida et al. |
| 6,865,068 B1 | 3/2005 | Murakami et al. |
| 6,887,617 B2 | 5/2005 | Sato et al. |
| 6,911,281 B2 | 6/2005 | Sonoda et al. |
| 6,914,768 B2 | 7/2005 | Matsumoto et al. |
| 6,946,007 B2 | 9/2005 | Bendale et al. |
| 6,955,694 B2 | 10/2005 | Bendale et al. |
| 7,046,503 B2 | 5/2006 | Hinoki et al. |
| 7,057,879 B2 | 6/2006 | Iwaida et al. |
| 7,061,750 B2 | 6/2006 | Oyama et al. |
| 7,068,494 B2 | 6/2006 | Fujino |
| 7,090,946 B2 | 8/2006 | Mitchell et al. |
| 7,092,239 B2 | 8/2006 | Nakazawa et al. |
| 7,095,603 B2 | 8/2006 | Mahon et al. |
| 7,102,877 B2 | 9/2006 | Mitchell et al. |
| 7,154,738 B2 | 12/2006 | Oyama et al. |
| 7,167,353 B2 | 1/2007 | Yuyama et al. |
| 7,173,807 B2 | 2/2007 | Kawasato et al. |
| 7,236,349 B2 | 6/2007 | Miyaki et al. |
| 7,245,478 B2 | 7/2007 | Zhong et al. |
| 7,256,981 B2 | 8/2007 | Kosuda et al. |
| 7,262,511 B2 | 8/2007 | Osako et al. |
| 7,273,597 B2 | 9/2007 | Takeuchi et al. |
| 7,295,423 B1 | 11/2007 | Mitchell et al. |
| 7,310,219 B2 | 12/2007 | Kosuda et al. |
| 7,314,514 B2 | 1/2008 | Drummond et al. |
| 7,327,556 B2 | 2/2008 | Ro et al. |
| 7,342,769 B2 | 3/2008 | Sato et al. |
| 7,352,558 B2 | 4/2008 | Zhong et al. |
| 7,388,740 B2 | 6/2008 | Ro et al. |
| 7,391,603 B2 | 6/2008 | Fujino et al. |
| 7,394,648 B2 | 7/2008 | Kondo et al. |
| 7,397,650 B2 | 7/2008 | Sato et al. |
| 7,411,777 B2 | 8/2008 | Chiba |
| 7,436,651 B2 | 10/2008 | Takeda et al. |
| 7,486,497 B2 | 2/2009 | Kobayashi et al. |
| 7,491,352 B2 | 2/2009 | Ito |
| 7,492,571 B2 | 2/2009 | Zhong et al. |
| 7,508,651 B2 | 3/2009 | Mitchell et al. |
| 7,554,793 B2 | 6/2009 | Chacko |
| 7,564,676 B2 | 7/2009 | Kitajima et al. |
| 7,567,429 B2 | 7/2009 | Mori et al. |
| 7,616,430 B2 | 11/2009 | Ro et al. |
| 7,623,339 B2 | 11/2009 | Takahashi et al. |
| 7,623,340 B1 | 11/2009 | Song et al. |
| 7,639,475 B2 | 12/2009 | Ro et al. |
| 7,656,645 B2 | 2/2010 | Chiba |
| 7,706,130 B2 | 4/2010 | Shimoyama et al. |
| 7,722,686 B2 | 5/2010 | Xi et al. |
| 7,785,495 B2 | 8/2010 | Kikuchi et al. |
| 7,791,860 B2 | 9/2010 | Mitchell et al. |
| 7,791,861 B2 | 9/2010 | Zhong et al. |
| 7,800,886 B2 | 9/2010 | Itahashi et al. |
| 7,811,337 B2 | 10/2010 | Zhong et al. |
| 7,835,136 B2 | 11/2010 | Feaver et al. |
| 7,858,242 B2 | 12/2010 | Fujioka et al. |
| 7,864,508 B2 | 1/2011 | Fukumine |
| 7,897,281 B2 | 3/2011 | Yamakawa et al. |
| 7,911,767 B2 | 3/2011 | Sung et al. |
| 7,923,411 B2 | 4/2011 | Tanaka et al. |
| 7,924,549 B1 | 4/2011 | Smith et al. |
| 7,933,114 B2 | 4/2011 | Baca et al. |
| 7,948,738 B2 | 5/2011 | Shimamoto et al. |
| 7,951,495 B2 | 5/2011 | Otsuki et al. |
| 8,007,680 B2 | 8/2011 | Fujioka et al. |
| 8,072,734 B2 | 12/2011 | Zhong et al. |
| 8,094,433 B2 | 1/2012 | Tian et al. |
| 8,213,156 B2 | 7/2012 | Mitchell et al. |

(56) References Cited

U.S. PATENT DOCUMENTS

| | | | |
|---|---|---|---|
| 8,273,263 B2 | 9/2012 | Kubo et al. | |
| 8,277,691 B2 | 10/2012 | Lu | |
| 8,279,580 B2 | 10/2012 | Zhong et al. | |
| 8,300,385 B2 | 10/2012 | Baca et al. | |
| 8,405,955 B2 | 3/2013 | Gadkaree et al. | |
| 8,467,170 B2 | 6/2013 | Feaver et al. | |
| 8,475,676 B2 | 7/2013 | Aitchison et al. | |
| 8,482,900 B2 | 7/2013 | Gadkaree et al. | |
| 8,482,901 B2 | 7/2013 | Gadkaree et al. | |
| 8,497,225 B2 | 7/2013 | Zhamu et al. | |
| 8,541,338 B2 | 9/2013 | Gadkaree et al. | |
| 8,559,162 B2 | 10/2013 | Shen et al. | |
| 8,591,601 B2 | 11/2013 | Zhong et al. | |
| 8,591,757 B2 | 11/2013 | Ohishi et al. | |
| 8,705,225 B2 | 4/2014 | Ohashi et al. | |
| 8,760,851 B2 | 6/2014 | Signorelli et al. | |
| 8,780,527 B2 | 7/2014 | Thompson et al. | |
| 8,785,057 B1 | 7/2014 | Smith et al. | |
| 8,797,717 B2 | 8/2014 | Feaver et al. | |
| 8,804,309 B2 | 8/2014 | Brandon et al. | |
| 8,835,667 B2 | 9/2014 | Shinohara et al. | |
| 8,848,338 B2 | 9/2014 | Norieda et al. | |
| 8,911,510 B2 | 12/2014 | Leis et al. | |
| 9,006,136 B2 | 4/2015 | Gadkaree et al. | |
| 9,034,517 B1 | 5/2015 | Smith et al. | |
| 9,136,064 B2 | 9/2015 | Gadkaree et al. | |
| 9,164,082 B2 | 10/2015 | Inoue et al. | |
| 9,272,627 B2 | 3/2016 | Miller | |
| 9,425,000 B2 | 8/2016 | Lin et al. | |
| 9,478,364 B2 | 10/2016 | Gadkaree et al. | |
| 9,478,366 B2 | 10/2016 | Yokouchi et al. | |
| 9,515,510 B2 | 12/2016 | Newlin | |
| 9,525,168 B2 | 12/2016 | Mitchell et al. | |
| 9,536,678 B2 | 1/2017 | Lane et al. | |
| 9,558,894 B2 | 1/2017 | Signorelli et al. | |
| 9,576,746 B2 | 2/2017 | Ueno et al. | |
| 9,607,776 B2 | 3/2017 | Gadkaree et al. | |
| 9,640,333 B2 | 5/2017 | Kumar et al. | |
| 9,679,703 B2 | 6/2017 | Bendale et al. | |
| 9,818,552 B2 | 11/2017 | Lane et al. | |
| 2002/0102464 A1 | 8/2002 | Yoshida et al. | |
| 2002/0138958 A1 | 10/2002 | Nonaka et al. | |
| 2002/0159222 A1* | 10/2002 | Nomoto | H01G 9/10 361/502 |
| 2003/0172509 A1 | 9/2003 | Maletin et al. | |
| 2004/0146786 A1 | 7/2004 | Sato et al. | |
| 2005/0057888 A1 | 3/2005 | Mitchell et al. | |
| 2005/0127319 A1 | 6/2005 | Fujioka et al. | |
| 2005/0147885 A1 | 7/2005 | Sato et al. | |
| 2005/0266298 A1 | 12/2005 | Mitchell et al. | |
| 2006/0137158 A1 | 6/2006 | Zou et al. | |
| 2006/0147712 A1 | 7/2006 | Mitchell et al. | |
| 2006/0246343 A1 | 11/2006 | Mitchell et al. | |
| 2006/0274475 A1* | 12/2006 | Chiba | H01G 9/038 361/272 |
| 2007/0146967 A1 | 6/2007 | Xi et al. | |
| 2007/0194266 A1* | 8/2007 | Chiba | H01G 9/038 252/62.2 |
| 2007/0258193 A1 | 11/2007 | Zhong et al. | |
| 2008/0014139 A1 | 1/2008 | Zhong et al. | |
| 2008/0089006 A1 | 4/2008 | Zhong et al. | |
| 2008/0089012 A1* | 4/2008 | Kon | H01G 11/24 361/502 |
| 2008/0089013 A1 | 4/2008 | Zhong et al. | |
| 2008/0102371 A1 | 5/2008 | Mitchell et al. | |
| 2008/0106850 A1 | 5/2008 | Zhong et al. | |
| 2008/0130202 A1* | 6/2008 | Ro | H01G 9/0425 361/516 |
| 2008/0201925 A1 | 8/2008 | Zhong et al. | |
| 2008/0204973 A1 | 8/2008 | Zhong et al. | |
| 2008/0233468 A1 | 9/2008 | Okohata et al. | |
| 2008/0297981 A1 | 12/2008 | Endo et al. | |
| 2009/0097188 A1 | 4/2009 | Mitchell | |
| 2009/0152510 A1 | 6/2009 | Ito | |
| 2009/0268377 A1 | 10/2009 | Choi et al. | |
| 2009/0303658 A1* | 12/2009 | Hiroyuki | H01G 9/038 361/502 |
| 2010/0033901 A1 | 2/2010 | Mitchell et al. | |
| 2010/0067173 A1 | 3/2010 | Guillet et al. | |
| 2010/0110613 A1 | 5/2010 | Zhong et al. | |
| 2011/0027537 A1 | 2/2011 | Inoue et al. | |
| 2011/0149473 A1 | 6/2011 | Eilertsen et al. | |
| 2011/0165318 A9 | 7/2011 | Zhong et al. | |
| 2012/0134070 A1* | 5/2012 | Gadkaree | C01B 32/342 361/502 |
| 2012/0187347 A1 | 7/2012 | Eilertsen et al. | |
| 2012/0200308 A1 | 8/2012 | Donne | |
| 2012/0236467 A1 | 9/2012 | Kang et al. | |
| 2012/0237748 A1 | 9/2012 | Lin et al. | |
| 2013/0108915 A1 | 5/2013 | Fukuda et al. | |
| 2014/0029165 A1 | 1/2014 | Takahashi et al. | |
| 2014/0057164 A1 | 2/2014 | Brambilla et al. | |
| 2014/0098465 A1 | 4/2014 | Bendale et al. | |
| 2014/0098466 A1 | 4/2014 | Bilyk et al. | |
| 2014/0104754 A1 | 4/2014 | Lipka et al. | |
| 2014/0118884 A1* | 5/2014 | Lin | C04B 35/14 361/502 |
| 2014/0126112 A1 | 5/2014 | Nguyen et al. | |
| 2014/0346046 A1* | 11/2014 | Andelman | C02F 1/4691 204/554 |
| 2014/0368973 A1 | 12/2014 | Bouchard et al. | |
| 2014/0377668 A1 | 12/2014 | Abe et al. | |
| 2015/0062780 A1* | 3/2015 | Gadkaree | H01G 11/38 361/502 |
| 2015/0062781 A1 | 3/2015 | Feaver et al. | |
| 2015/0213967 A1* | 7/2015 | Yokouchi | H01M 4/661 429/211 |
| 2015/0244031 A1 | 8/2015 | Adamson et al. | |
| 2015/0357127 A1* | 12/2015 | Horii | H01G 11/34 361/502 |
| 2015/0380175 A1 | 12/2015 | Rawal et al. | |
| 2016/0204492 A1 | 7/2016 | Jiang et al. | |
| 2017/0244098 A1 | 8/2017 | Duong et al. | |
| 2017/0338054 A1 | 11/2017 | Knopsnyder et al. | |
| 2017/0338055 A1 | 11/2017 | Knopsnyder et al. | |
| 2017/0338061 A1 | 11/2017 | Knopsnyder et al. | |
| 2017/0338669 A1 | 11/2017 | Hansen | |
| 2018/0144878 A1 | 5/2018 | Ritter et al. | |

FOREIGN PATENT DOCUMENTS

| | | | | |
|---|---|---|---|---|
| CN | 102101668 B | | 5/2012 | |
| EP | 1 255 261 A1 | | 11/2002 | |
| EP | 1 256 966 A1 | | 11/2002 | |
| EP | 1256966 A1 | * | 11/2002 | H01G 11/28 |
| JP | H 01155108 A | | 6/1989 | |
| JP | H 0269916 A | | 3/1990 | |
| JP | H 02125410 A | | 5/1990 | |
| JP | H 04196511 A | | 7/1992 | |
| JP | H 0845792 A | | 2/1996 | |
| JP | H 09320906 A | | 12/1997 | |
| JP | H 1131523 A | | 2/1999 | |
| JP | 2001146410 A | | 5/2001 | |
| JP | 2002246277 A | | 8/2002 | |
| JP | 2003243265 | | 8/2003 | |
| JP | 2004253562 | | 9/2004 | |
| JP | 2004296181 A | | 10/2004 | |
| JP | 3848435 B2 | | 11/2006 | |
| JP | 4259900 B2 | | 4/2009 | |
| JP | 4618929 B2 | | 1/2011 | |
| JP | 4668377 B2 | | 4/2011 | |
| JP | 2011176043 A | | 9/2011 | |
| JP | 2012069408 | | 4/2012 | |
| JP | 5207338 B2 | | 6/2013 | |
| JP | 2016001672 A | * | 1/2016 | |
| KR | 100733391 B1 | | 6/2007 | |
| KR | 20130134964 A | | 12/2013 | |
| TW | WO 01/37295 A1 | | 5/2001 | |
| WO | WO2013126915 | | 8/2013 | |
| WO | WO 2016/057983 A2 | | 4/2016 | |

(56) References Cited

FOREIGN PATENT DOCUMENTS

OTHER PUBLICATIONS

International Search Report and Written Opinion for PCT/US2017/033126 dated Aug. 28, 2017, 12 pages.

* cited by examiner

A Patent document page

NONAQUEOUS ELECTROLYTE FOR AN ULTRACAPACITOR

RELATED APPLICATIONS

The present application claims priority to U.S. Provisional Application Ser. No. 62/339,153, filed on May 20, 2016, which is incorporated herein in its entirety by reference thereto.

BACKGROUND OF THE INVENTION

Electrical energy storage cells are widely used to provide power to electronic, electromechanical, electrochemical, and other useful devices. An electric double layer ultracapacitor, for instance, generally employs a pair of polarizable electrodes that contain carbon particles (e.g., activated carbon) impregnated with a liquid electrolyte. Due to the effective surface area of the particles and the small spacing between the electrodes, large capacitance values may be achieved. Nevertheless, problems remain. For instance, certain components of conventional ultracapacitors are also sensitive to high temperatures, which may cause leakage of the electrolyte from the capacitor, and in turn lead to reduced capacitance and increased equivalent series resistance ("ESR"). As such, a need currently exists for an improved ultracapacitor.

SUMMARY OF THE INVENTION

In accordance with one embodiment of the present invention, an ultracapacitor is disclosed that comprises a first electrode, second electrode, separator, nonaqueous electrolyte, and a housing that contains a metal container. The first electrode comprises a first current collector electrically coupled to a first carbonaceous coating and the second electrode comprises a second current collector electrically coupled to a second carbonaceous coating. The separator is positioned between the first electrode and the second electrode. The nonaqueous electrolyte is in ionic contact with the first electrode and the second electrode, wherein the nonaqueous electrolyte contains an ionic liquid that is dissolved in a nonaqueous solvent at a concentration of about 1.0 mole per liter or more. The nonaqueous solvent has a boiling temperature of about 150° C. or more. The first electrode, the second electrode, the separator, and the electrolyte are retained within the housing.

Other features and aspects of the present invention are set forth in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figure in which.

Figure 1:
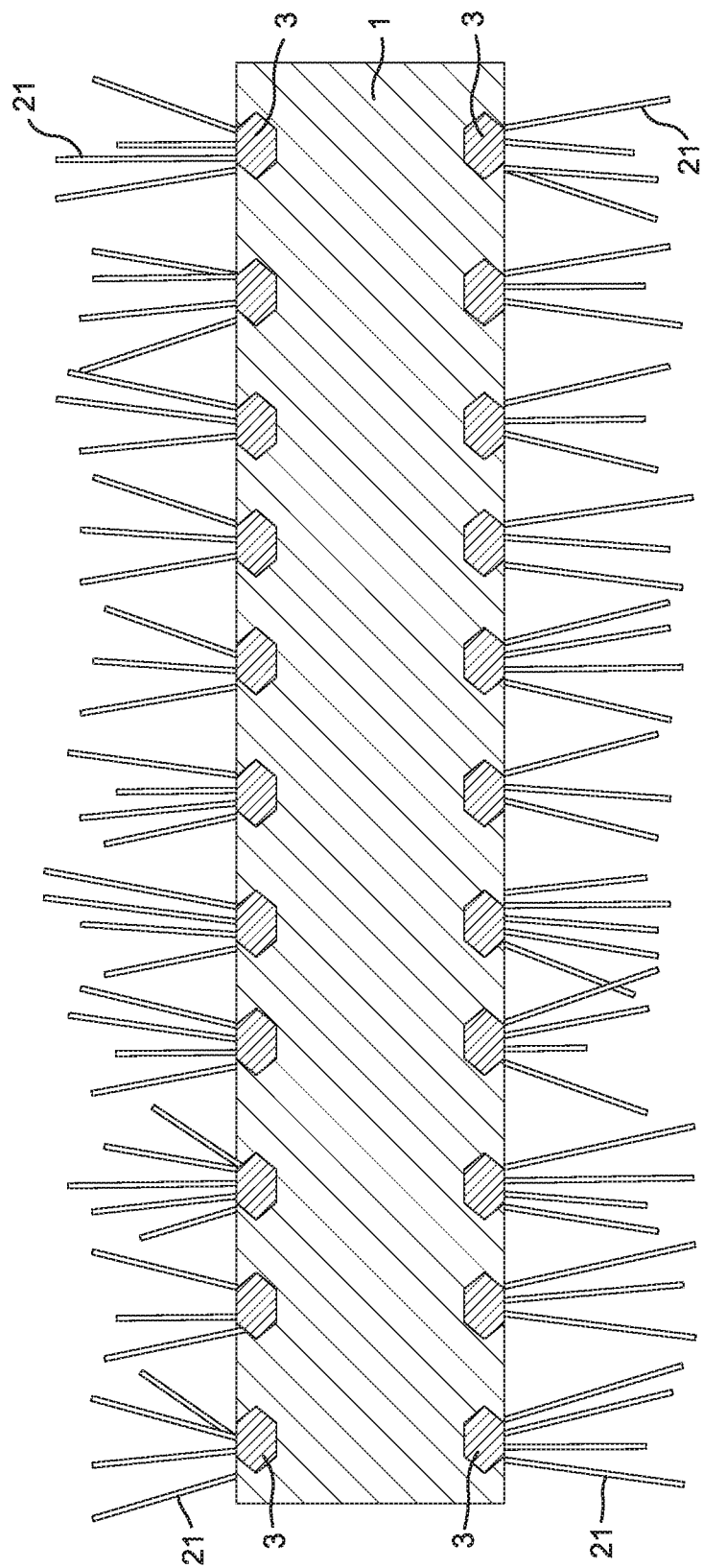
FIG. 1 is a schematic view of one embodiment of a current collector that may be employed in the ultracapacitor of the present invention.

Repeat use of reference characters in the present specification and drawing is intended to represent same or analogous features or elements of the invention.

DETAILED DESCRIPTION OF REPRESENTATIVE EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Generally speaking, the present invention is directed an ultracapacitor that contains a first electrode that contains a first carbonaceous coating (e.g., activated carbon particles) electrically coupled to a first current collector, and a second electrode that contains a second carbonaceous coating (e.g., activated carbon particles) electrically coupled to a second current collector. A separator is also positioned between the first electrode and the second electrode, and an electrolyte is in ionic contact with the first electrode and the second electrode. The first electrode, second electrode, separator, and electrotype are retained within a housing that is formed from a metal container (e.g., cylindrical can).

The present inventors have discovered that through selective control over the particular nature of the nonaqueous electrolyte, a variety of beneficial properties may be achieved. More particularly, the electrolyte is generally nonaqueous in nature and thus contains at least one nonaqueous solvent. To help extend the operating temperature range of the ultracapacitor, the nonaqueous solvent has a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Propylene carbonate is particularly suitable due to its high electric conductivity and decomposition voltage, as well as its ability to be used over a wide range of temperatures. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte also contains at least one ionic liquid, which is dissolved in the nonaqueous solvent. Typically, the ionic liquid is present at a relatively high concentration. For example, the ionic liquid may be present in an amount of about 1.0 mole per liter (M) of the electrolyte or more, in some embodiments about 1.2 M or more, in some embodiments about 1.3 M or more, and in some embodiments, from about 1.4 to about 1.8 M.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyrimidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the following structure:

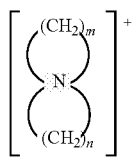

wherein m and n are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis(pentafluoroethyl-sulfonyl)imide, bis(trifluoromethylsulfonyl)imide, bis(trifluoromethyl)imide, etc.); borates (e.g., tetrafluoroborate, tetracyanoborate, bis[oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

As indicated above, the ultracapacitor of the present invention also contains a first current collector and a second current collector. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present invention. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

In certain embodiments, at least one of the first and second current collectors, and preferably both, also contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). Referring to FIG. 1, for instance, one embodiment of a current collector is shown that contains a plurality of whiskers 21 projecting outwardly from a substrate 1. If desired, the whiskers 21 may optionally project from a seed portion 3 that is embedded within the substrate 1. Similar to the whiskers 21, the seed portion 3 may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

Figure 2:
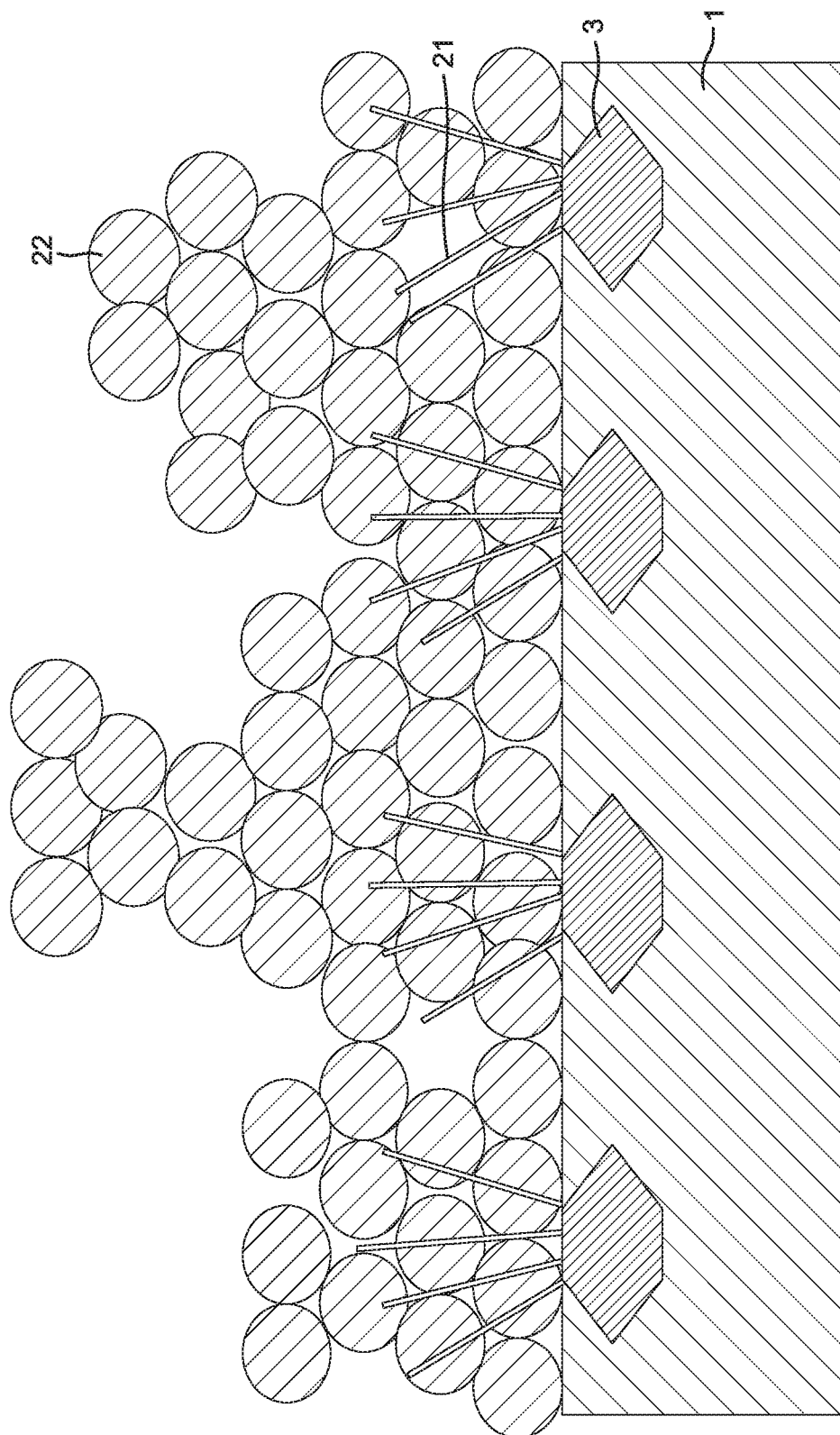
FIG. 2 is a schematic view of one embodiment of a current collector/carbonaceous coating configuration that may be employed in the ultracapacitor of the present invention.

The ultracapacitor of also contains first and second carbonaceous coatings that are electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Referring to FIG. 2, for example, carbon particles 22 may be disposed over the current collector 1. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique as is well known in the art.

As discussed above, one unique aspect of the present invention is that the electrodes need not contain a substantial amount of binders conventionally employed in ultracapacitor electrodes. That is, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Nevertheless, when employed, any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

If desired, other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary as is well known to those skilled in the art, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

A separator is also employed in the ultracapacitor that is positioned between the first and second electrodes. If desired, other separators may also be employed in the ultracapacitor of the present invention. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments from about 20 to about 80 micrometers.

The ultracapacitor of the present invention employs a housing within which the electrodes, electrolyte, and separator are retained and optionally hermetically sealed. To enhance the degree of hermetic sealing, the housing generally contains a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present invention. The metal container may have any of a variety of different shapes, such as cylindrical, D-shaped, etc. Cylindrically-shaped containers are particular suitable.

Figure 3:
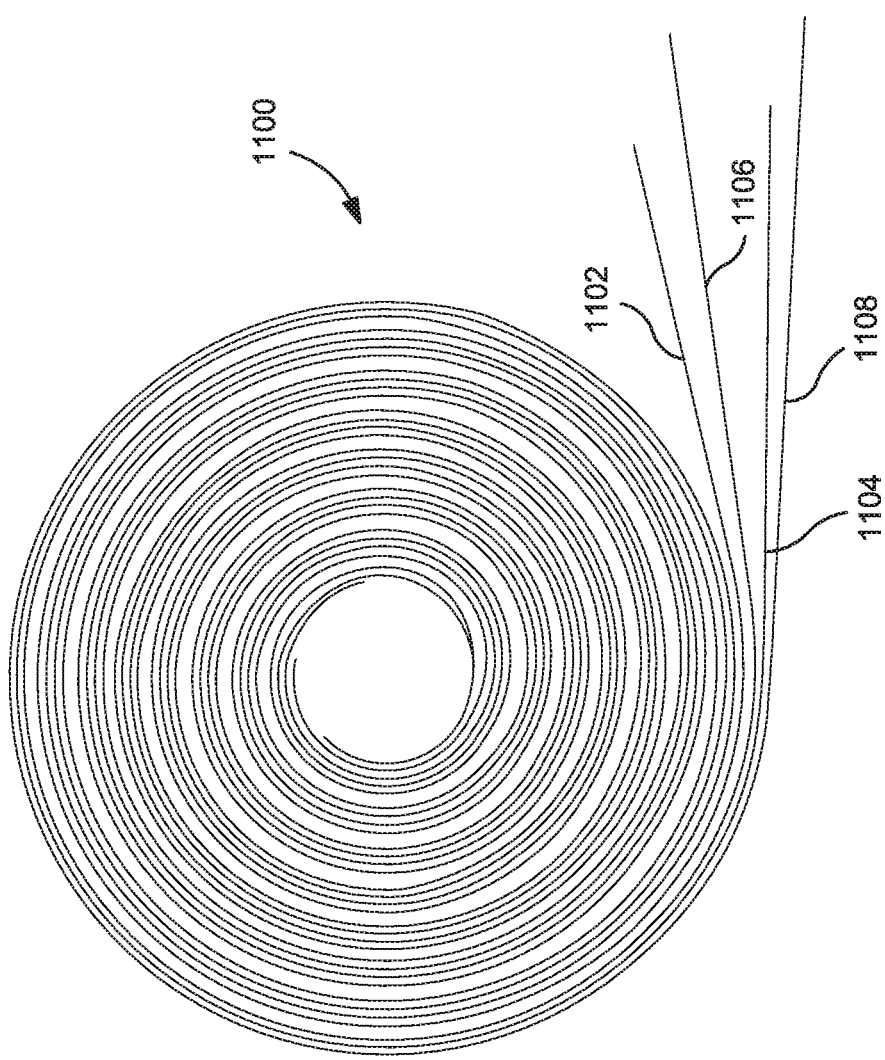
FIG. 3 is a schematic view illustrating one embodiment for forming an electrode assembly that can be used in the ultracapacitor of the present invention.

The manner in which these components are inserted into the housing may vary as is known in the art. For example, the electrodes and separator may be initially folded, wound, or otherwise contacted together to form an electrode assembly. The electrolyte may optionally be immersed into the electrodes of the assembly. In one particular embodiment, the electrodes, separator, and optional electrolyte may be wound into an electrode assembly having a "jelly-roll" configuration. Referring to FIG. 3, for instance, one embodiment of such a jellyroll electrode assembly 1100 is shown that contains a first electrode 1102, second electrode 1104, and a separator 1106 positioned between the electrodes 1102 and 1104. In this particular embodiment, the electrode assembly 1100 also includes another separator 1108 that is positioned over the second electrode 1104. In this manner, each of two coated surfaces of the electrodes is separated by a separator, thereby maximizing surface area per unit volume and capacitance. While by no means required, the electrodes 1102 and 1104 are offset in this embodiment so as to leave their respective contact edges extending beyond first and second edges of the first and second separators 1106 and 1108, respectively. Among other things, this can help prevent "shorting" due to the flow of electrical current between the electrodes.

Figure 4:
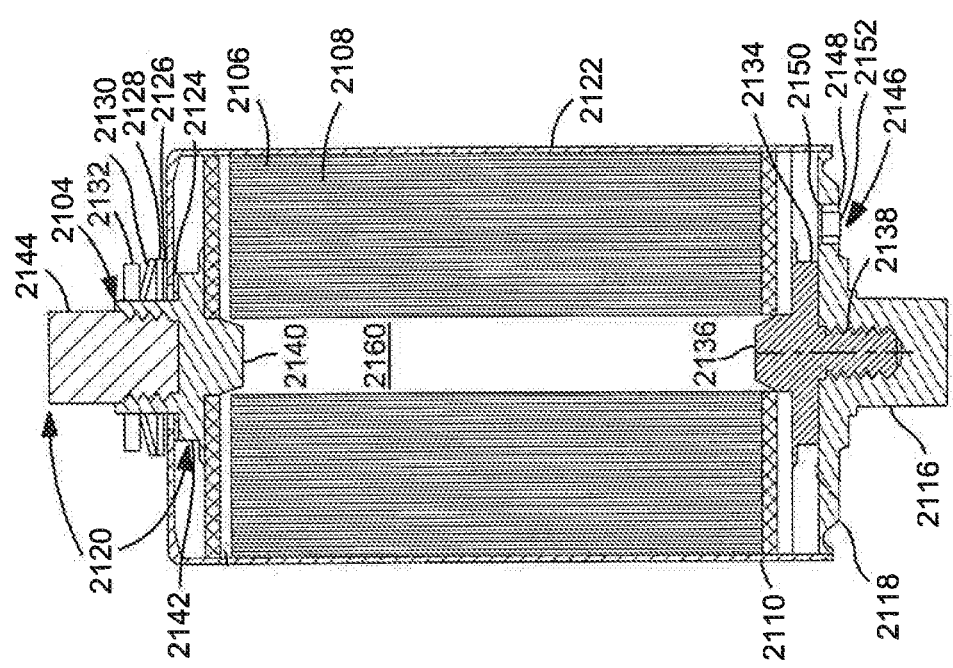
FIG. 4 is a schematic view of one embodiment of the ultracapacitor of the present invention.

The electrode assembly may be sealed within the cylindrical housing using a variety of different techniques. Referring to FIG. 4, one embodiment of an ultracapacitor is shown that contains an electrode assembly 2108, which contains layers 2106 wound together in a jellyroll configuration as discussed above. In this particular embodiment, the ultracapacitor contains a first collector disc 2114, which contains a disc-shaped portion 2134, a stud portion 2136, and a fastener 2138 (e.g., screw). The collector disc 2114 is aligned with a first end of a hollow core 2160, which is formed in the center of the electrode assembly, and the stud portion 2136 is then inserted into an opening of the core so that the disc-shaped portion 2134 sits against the first end of the electrode assembly 2108 at a first contact edge 2110. A lid 2118 is welded (e.g., laser welded) to a first terminal post 2116, and a socket, which may be for example, threaded, is coupled to the fastener 2138. The ultracapacitor also contains a second collector disc 2120, which contains a disc-shaped portion 2142, a stud portion 2140, and a second terminal post 2144. The second collector disc 2120 is aligned with the second end of the hollow core 2160, and the stud portion 2140 is then inserted into the opening of the core so that the collector disc portion 2142 sits against the second end of the electrode assembly 2108.

A metal container 2122 (e.g., cylindrically-shaped can) is thereafter slid over the electrode assembly 2108 so that the second collector disc 2120 enters the container 2122 first, passes through a first insulating washer 2124, passes through an axial hole at an end of the container 2122, and then passes through a second insulating washer 2126. The second collector disc 2120 also passes through a flat washer 2128 and a spring washer 2130. A locknut 2132 is tightened over the spring washer 2130, which compresses the spring washer 2130 against the flat washer 2128, which in turn is compressed against the second insulating washer 2126. The second insulating washer 2126 is compressed against the exterior periphery of the axial hole in the metal container 2122, and as the second collector disc 2120 is drawn by this compressive force toward the axial hole, the first insulating washer 2124 is compressed between the second collector disc 2120 and an interior periphery of the axial hole in the container 2122. A flange on the first insulating washer 2124 inhibits electrical contact between the second collector disc 2120 and a rim of the axial hole. Simultaneously, the lid 2118 is drawn into an opening of the container 2122 so that a rim of the lid 2118 sits just inside a lip of the opening of the container 2122. The rim of the lid 2118 is then welded to the lip of the opening of the container 2122.

Once the locknut 2132 is tightened against the spring washer 2130, a hermetic seal may be formed between the axial hole, the first insulating washer 2124, the second insulating washer 2126, and the second collector disc 2120. Similarly, the welding of the lid 2118 to the lip of the container 2122, and the welding of the lid 2118 to the first terminal post 2116, may form another hermetic seal. A hole 2146 in the lid 2118 can remain open to serve as a fill port for the electrolyte described above. Once the electrolyte is in the can (i.e., drawn into the can under vacuum, as described above), a bushing 2148 is inserted into the hole 2146 and seated against a flange 2150 at an interior edge of the hole 2146. The bushing 2148 may, for instance, be a hollow cylinder in shape, fashioned to receive a plug 2152. The plug 2152, which is cylindrical in shape, is pressed into a center of the bushing 2148, thereby compressing the bushing 2148 against an interior of the hole 2146 and forming a hermetic seal between the hole 2146, the bushing 2148, and the plug 2152. The plug 2152 and the bushing 2148 may be selected to dislodge when a prescribed level of pressure is reached within the ultracapacitor, thereby forming an overpressure safety mechanism.

The embodiments described above generally refer to the use of a single electrochemical cell in the capacitor. It should of course be understood, however, that the capacitor of the present invention may also contain two or more electrochemical cells. In one such embodiment, for example, the capacitor may include a stack of two or more electrochemical cells, which may be the same or different.

The resulting ultracapacitor can still exhibit excellent electrical properties. For example, the ultracapacitor may exhibit a capacitance of about 6 Farads per cubic centimeter ("$F/cm^3$") or more, in some embodiments about 8 $F/cm^3$ or more, in some embodiments from about 9 to about 100 $F/cm^3$, and in some embodiments, from about 10 to about 80 $F/cm^3$, measured at a temperature of 23° C., frequency of 120 Hz, and without an applied voltage. The ultracapacitor may also have a low equivalence series resistance ("ESR"), such as about 150 mohms or less, in some embodiments less than about 125 mohms, in some embodiments from about 0.01 to about 100 mohms, and in some embodiments, from about 0.05 to about 70 mohms, determined at a temperature of 23° C., frequency of 100 kHz, and without an applied voltage.

Notably, the ultracapacitor may also exhibit excellent electrical properties even when exposed to high temperatures. For example, the ultracapacitor may be placed into contact with an atmosphere having a temperature of from about 80° C. or more, in some embodiments from about 100° C. to about 150° C., and in some embodiments, from about 105° C. to about 130° C. (e.g., 85° C. or 105° C.). The capacitance and ESR values can remain stable at such temperatures for a substantial period of time, such as for about 100 hours or more, in some embodiments from about 300 hours to about 5000 hours, and in some embodiments, from about 600 hours to about 4500 hours (e.g., 168, 336, 504, 672, 840, 1008, 1512, 2040, 3024, or 4032 hours).

In one embodiment, for example, the ratio of the capacitance value of the ultracapacitor after being exposed to the hot atmosphere (e.g., 85° C. or 105° C.) for 1008 hours to the capacitance value of the ultracapacitor when initially exposed to the hot atmosphere is about 0.75 or more, in some embodiments from about 0.8 to 1.0, and in some embodiments, from about 0.85 to 1.0. Such high capacitance values can also be maintained under various extreme conditions, such as when applied with a voltage and/or in a humid atmosphere. For example, the ratio of the capacitance value of the ultracapacitor after being exposed to the hot atmosphere (e.g., 85° C. or 105° C.) and an applied voltage to the initial capacitance value of the ultracapacitor when exposed to the hot atmosphere but prior to being applied with the voltage may be about 0.60 or more, in some embodiments from about 0.65 to 1.0, and in some embodiments, from about 0.7 to 1.0. The voltage may, for instance, be about 1 volt or more, in some embodiments about 1.5 volts or more, and in some embodiments, from about 2 to about 10 volts (e.g., 2.1 volts). In one embodiment, for example, the ratio noted above may be maintained for 1008 hours or more. The ultracapacitor may also maintain the capacitance values noted above when exposed to high humidity levels, such as when placed into contact with an atmosphere having a relative humidity of about 40% or more, in some embodiments about 45% or more, in some embodiments about 50% or more, and in some embodiments, about 70% or more (e.g., about 85% to 100%). Relative humidity may, for instance, be determined in accordance with ASTM E337-02, Method A (2007). For example, the ratio of the capacitance value of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 0.7 or more, in some embodiments from about 0.75 to 1.0, and in some embodiments, from about 0.80 to 1.0. In one embodiment, for example, this ratio may be maintained for 1008 hours or more.

The ESR can also remain stable at such temperatures for a substantial period of time, such as noted above. In one embodiment, for example, the ratio of the ESR of the ultracapacitor after being exposed to the hot atmosphere (e.g., 85° C. or 105° C.) for 1008 hours to the ESR of the ultracapacitor when initially exposed to the hot atmosphere is about 1.5 or less, in some embodiments about 1.2 or less, and in some embodiments, from about 0.2 to about 1. Notably, such low ESR values can also be maintained under various extreme conditions, such as when applied with a high voltage and/or in a humid atmosphere as described above. For example, the ratio of the ESR of the ultracapacitor after being exposed to the hot atmosphere (e.g., 85° C. or 105° C.) and an applied voltage to the initial ESR of the ultracapacitor when exposed to the hot atmosphere but prior to being applied with the voltage may be about 1.8 or less, in some embodiments about 1.7 or less, and in some embodiments, from about 0.2 to about 1.6. In one embodiment, for example, the ratio noted above may be maintained for 1008 hours or more. The ultracapacitor may also maintain the ESR values noted above when exposed to high humidity levels. For example, the ratio of the ESR of the ultracapacitor after being exposed to the hot atmosphere (e.g., 85° C. or 105° C.) and high humidity (e.g., 85%) to the initial capacitance value of the ultracapacitor when exposed to the hot atmosphere but prior to being exposed to the high humidity may be about 1.5 or less, in some embodiments about 1.4 or less, and in some embodiments, from about 0.2 to about 1.2. In one embodiment, for example, this ratio may be maintained for 1008 hours or more.

The present invention may be better understood with reference to the following example.

Test Methods

Equivalent Series Resistance (ESR)

Equivalence series resistance may be measured using a Keithley 3330 Precision LCZ meter with a DC bias of 0.0 volts, 1.1 volts, or 2.1 volts (0.5 volt peak to peak sinusoidal signal). The operating frequency is 1 kHz. A variety of temperature and relative humidity levels may be tested. For example, the temperature may be 85° C. or 105° C., and the relative humidity may be 25% or 85%.

Capacitance

The capacitance may be measured using a Keithley 3330 Precision LCZ meter with a DC bias of 0.0 volts, 1.1 volts, or 2.1 volts (0.5 volt peak to peak sinusoidal signal). The operating frequency is 120 Hz. A variety of temperature and relative humidity levels may be tested. For example, the temperature may be 85° C. or 105° C., and the relative humidity may be 25% or 85%.

EXAMPLE

The ability to form an electrochemical cell in accordance with the present invention was demonstrated. Initially, each side of two aluminum current collectors (thickness of 12 to 50 μm) containing aluminum carbide whiskers were coated with a mixture of 10-40 wt. % of activated carbon particles, 2-10 wt. % of a styrene-butadiene copolymer, and 5-40 wt. % of sodium carboxymethylcellulose. The activated carbon particles had a D50 size of about 5-20 μm and a BET surface area of about 1300-2200 m$^2$/g. The activated carbon particles contained pores with a size of less than 2 nanometers in an amount of less than 10 vol. %, pores with a size of 2 to 50 nanometers in an amount of about 40 to 70 vol. %, and pores with a size of greater than 50 nm in an amount of about 20 to 50 vol. %. The thickness of each resulting coating was about 12 to 200 μm. The electrodes were then calendered and dried under vacuum at a temperature of from 70° C. to 150° C. Once formed, the two electrodes were assembled with an electrolyte and separators (cellulose material having a thickness of 25 μm). The electrolyte contained 5-azoniaspiro[4,4]-nonanetetrafluoroborate at a concentration of 1.05 to 2.5 M in propylene carbonate. The resulting strip is cut into individual electrodes and assembled by stacking electrodes alternately with separators therebetween. Once the electrode stack is complete, all electrode terminals are welded to a single aluminum terminal. This assembly is then put into a plastic/aluminum/plastic laminated packaging material and all but one of the edges are heat sealed together. Next, the electrolyte is injected into the package through the open edge. The electrolyte-filled package is then put under vacuum and the final edge is heat sealed to complete the finished package. The resulting cells were formed and tested for ESR, capacitance, and volumetric efficiency. The results are set forth below in Tables 1-6:

TABLE 1

Average ESR (mohms) for 24 Samples at 0.0 Volt Bias

| | Time (hrs) | | | | | | | | | |
|---|---|---|---|---|---|---|---|---|---|---|
| | 0 | 168 | 336 | 504 | 672 | 840 | 1008 | 1512 | 2040 | 3024 | 4032 |
| 85° C. | 65 | 61 | 59 | 62 | 64 | 63 | 64 | 64 | 62 | 62 | 64 |
| 105° C. | 62 | 54 | 52 | 57 | 60 | 60 | 60 | 58 | 58 | 57 | 58 |

TABLE 2

Average Capacitance for 24 Samples at 0.0 Volt Bias

| | Time (hrs) | | | | | | | | | |
|---|---|---|---|---|---|---|---|---|---|---|
| | 0 | 168 | 336 | 504 | 672 | 840 | 1008 | 1512 | 2040 | 3024 | 4032 |
| 85° C. F | 2.1 | 2.0 | 2.0 | 2.0 | 1.9 | 1.9 | 1.9 | 2.0 | 2.0 | 2.0 | 1.9 |
| 85° C. F/cm$^3$ | 10.3 | 10.1 | 9.8 | 9.7 | 9.7 | 9.7 | 9.7 | 9.7 | 9.7 | 9.7 | 9.6 |
| 105° C. F | 2.0 | 2.0 | 1.9 | 1.9 | 1.9 | 1.9 | 1.9 | 1.9 | 1.9 | 1.9 | 1.8 |
| 105° C. F/cm$^3$ | 9.9 | 9.9 | 9.7 | 9.6 | 9.5 | 9.4 | 9.4 | 9.4 | 9.3 | 9.2 | 9.0 |

TABLE 3

Average ESR (mohms) for 16 Samples at 0.0 Volt Bias

| | Time (hrs) | | | | | | |
|---|---|---|---|---|---|---|---|
| | 0 | 168 | 336 | 504 | 672 | 840 | 1008 |
| 85° C., 85% Relative Humidity | 121 | 133 | 144 | 152 | 166 | 177 | 187 |

TABLE 4

Average Capacitance for 16 Samples at 0.0 Volt Bias

| | Time (hrs) | | | | | | |
|---|---|---|---|---|---|---|---|
| | 0 | 168 | 336 | 504 | 672 | 840 | 1008 |
| 85° C., 85% Relative Humidity F | 1.5 | 1.2 | 1.1 | 1.2 | 1.1 | 1.1 | 1.1 |
| 85° C., 85% Relative Humidity F/cm$^3$ | 7.7 | 5.7 | 5.7 | 6.0 | 5.5 | 5.6 | 5.5 |

TABLE 5

Average ESR (mohms) for 10 Samples at 2.1 Volt Bias

| | Time (hrs) | | | | | | |
|---|---|---|---|---|---|---|---|
| | 0 | 168 | 336 | 504 | 672 | 840 | 1008 |
| 85° C. | 146 | 163 | 167 | 169 | 171 | 173 | 175 |

TABLE 6

Average Capacitance for 16 Samples at 2.1 Volt Bias

| | | Time (hrs) | | |
|---|---|---|---|---|
| | | 0 | 504 | 1008 |
| 85° C., 85% Relative Humidity | F | 2.0 | 1.8 | 1.7 |
| 85° C., 85% Relative Humidity | F/cm³ | 10.1 | 9.2 | 8.7 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An ultracapacitor comprising:
a first electrode that comprises a first current collector electrically coupled to a first carbonaceous coating comprising activated carbon particles, a water-insoluble organic binder, and a water-soluble organic binder, wherein the combined weight percentage of the water-insoluble organic binder and the water-soluble organic binder in the first carbonaceous coating is less than 10 wt. %;
a second electrode that comprises a second current collector electrically coupled to a second carbonaceous coating comprising activated carbon particles, a water-insoluble organic binder, and a water-soluble organic binder, wherein the combined weight percentage of the water-insoluble organic binder and the water-soluble organic binder in the second carbonaceous coating is less than 10 wt. %,
wherein the activated carbon particles of the first carbonaceous coating, the second carbonaceous coating, or both have a total pore volume of from 0.2 cm³/g to 1.5 cm³/g and a median pore width of about 8 nanometers or less;
wherein the activated carbon particles of the first carbonaceous coating, the second carbonaceous coating, or both contain a plurality of pores, wherein the amount of pores having a size of about 2 nanometers or less is about 50 vol. % or less of the total pore volume, the amount of pores having a size of from about 2 nanometers to about 50 nanometers is about 20 vol. % to about 80 vol. % of the total pore volume, and the amount of pores having a size of about 50 nanometers or more is from about 1 vol. % to about 50 vol. % of the total pore volume;
wherein the first current collector and the second current collector each contain a substrate that includes a conductive metal, and the substrate of the first current collector, the substrate of the second current collector, or both has a thickness of about 200 micrometers or less;
a separator positioned between the first electrode and the second electrode;
a nonaqueous electrolyte that is in ionic contact with the first electrode and the second electrode, wherein the nonaqueous electrolyte contains an ionic liquid that is dissolved in a nonaqueous solvent at a concentration of 1.0 mole per liter or more, wherein the nonaqueous solvent has a boiling temperature of about 150° C. or more; and
a housing within which the first electrode, the second electrode, the separator, and the electrolyte are retained, wherein the housing contains a metal container, wherein the capacitor exhibits an equivalence series resistance of about 150 mohms or less as determined at a temperature of 23° C., frequency of 100 kHz, and without an applied voltage.

2. The ultracapacitor of claim 1, wherein the nonaqueous solvent includes a cyclic carbonate.

3. The ultracapacitor of claim 2, wherein the solvent includes propylene carbonate.

4. The ultracapacitor of claim 1, wherein the ionic liquid contains a cationic species and a counterion.

5. The ultracapacitor of claim 4, wherein the cationic species includes an organoquaternary ammonium compound.

6. The ultracapacitor of claim 5, wherein the organoquaternary ammonium compound has the following structure:

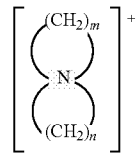

wherein m and n are independently a number from 3 to 7.

7. The ultracapacitor of claim 1, wherein the ionic liquid includes spiro-(1,1')-bipyrrolidinium tetrafluoroborate, spiro-(1,1')-bipyrrolidinium iodide, or a combination thereof.

8. The ultracapacitor of claim 1, wherein the ionic liquid is present at a concentration of about 1.2 moles per liter or more.

9. The ultracapacitor of claim 1, wherein the conductive metal is aluminum or an alloy thereof.

10. The ultracapacitor of claim 1, wherein a plurality of fiber-like whiskers project outwardly from the substrate of the first current collector, the substrate of the second current collector, or both.

11. The ultracapacitor of claim 10, wherein the whiskers contain aluminum carbide.

12. The ultracapacitor of claim 1, wherein at least 50% by volume of the activated carbon particles have a size of from about 1 to about 30 micrometers.

13. The ultracapacitor of claim 1, wherein the activated carbon particles contain a plurality of pores, wherein the amount of pores having a size of about 2 nanometers or less is about 30 vol. % or less of the total pore volume, the amount of pores having a size of from about 2 nanometers to about 50 nanometers is about 25 vol. % to about 75 vol. % of the total pore volume, and the amount of pores having a size of about 50 nanometers or more is from about 5 vol. % to about 40 vol. % of the total pore volume.

14. The ultracapacitor of claim 1, wherein the first carbonaceous coating, the second carbonaceous coating, or both contain binders in an amount of about 15 wt. % or less.

15. The ultracapacitor of claim 1, wherein the first electrode, the second electrode, or both have a thickness of from about 40 micrometers to about 350 micrometers.

16. The ultracapacitor of claim 1, wherein the separator includes a cellulosic fibrous material.

17. The ultracapacitor of claim 1, wherein the metal container has a cylindrical shape.

18. The ultracapacitor of claim 1, wherein the first electrode, the second electrode, the electrolyte, and the separator are hermetically sealed within the housing.

19. The ultracapacitor of claim 1, wherein the first electrode, the second electrode, and the separator are wound into an electrode assembly having a jellyroll configuration.

20. The ultracapacitor of claim 1, wherein the activated carbon particles have a BET surface area of from about 900 m$^2$/g to about 2,000 m$^2$/g.

21. The ultracapacitor of claim 1, wherein at least 90% by volume of the particles (D90 size) have a size in the range of from 6 to about 15 micrometers.

22. The ultracapacitor of claim 1, wherein the activated carbon particles are present in the first carbonaceous coating, the second carbonaceous coating, or both in an amount of 85 wt. % or more.

23. An ultracapacitor comprising:
   a first electrode that comprises a first current collector electrically coupled to a first carbonaceous coating comprising activated carbon;
   a second electrode that comprises a second current collector electrically coupled to a second carbonaceous coating comprising activated carbon;
   wherein the activated carbon particles of the first carbonaceous coating, the second carbonaceous coating, or both have a total pore volume of from 0.2 cm$^3$/g to 1.5 cm$^3$/g and a median pore width of about 8 nanometers or less;
   wherein the activated carbon particles of the first carbonaceous coating, the second carbonaceous coating, or both contain a plurality of pores, wherein the amount of pores having a size of about 2 nanometers or less is about 50 vol. % or less of the total pore volume, the amount of pores having a size of from about 2 nanometers to about 50 nanometers is about 20 vol. % to about 80 vol. % of the total pore volume, and the amount of pores having a size of about 50 nanometers or more is from about 1 vol. % to about 50 vol. % of the total pore volume;
   a separator positioned between the first electrode and the second electrode;
   a nonaqueous electrolyte that is in ionic contact with the first electrode and the second electrode, wherein the nonaqueous electrolyte contains an ionic liquid that is dissolved in a nonaqueous solvent at a concentration of 1.0 mole per liter or more, wherein the nonaqueous solvent has a boiling temperature of about 150° C. or more; and
   a housing within which the first electrode, the second electrode, the separator, and the electrolyte are retained, wherein the housing contains a metal container,
   wherein the capacitor exhibits an equivalence series resistance of about 150 mohms or less as determined at a temperature of 23° C., frequency of 100 kHz, and without an applied voltage.

* * * * *